Patented Mar. 17, 1936

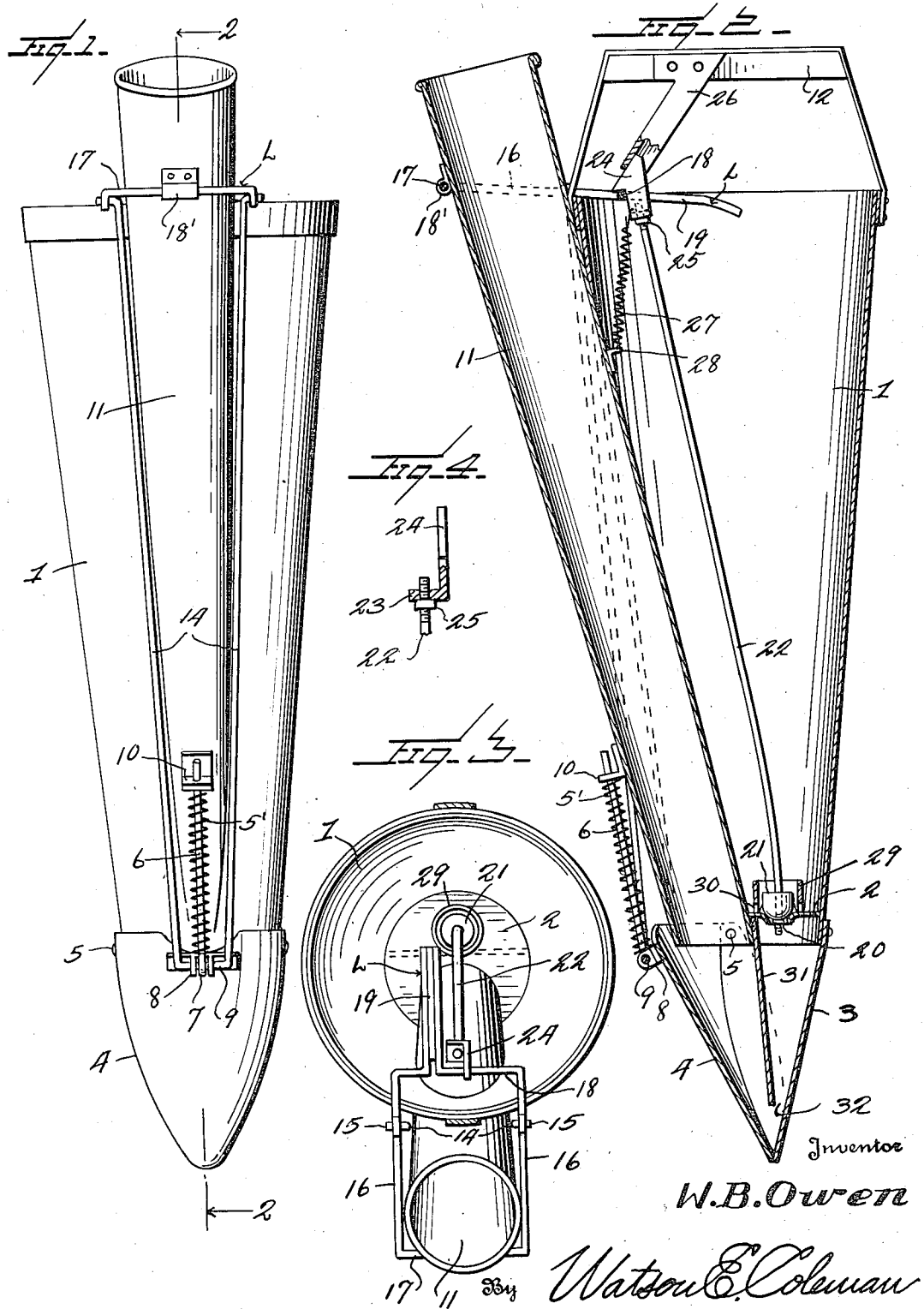

2,034,530

UNITED STATES PATENT OFFICE 2,034,530

TOBACCO PLANTER

Ward B. Owen, Brookneal, Va.

Application February 9, 1935, Serial No. 5,787

2 Claims. (Cl. 111—4)

This invention relates to a tobacco planter and the invention has for an object to provide a device of this kind which is readily portable and which in its operation provides for the discharge of the desired supply of water before the setting of the plant.

It is also an object of the invention to provide a device of this kind having means whereby the plant just before being set is effectively protected from the water being discharged.

The invention consists in the details of construction and in the combination and arrangement of the several parts of my improved tobacco planter whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in elevation of a planter constructed in accordance with an embodiment of my invention;

Figure 2 is a sectional view taken substantially on the line 2—2 of Figure 1;

Figure 3 is a view in top plan of the structure as herein disclosed with the hand grip removed;

Figure 4 is a detailed fragmentary view illustrating the connection between the valve rod and the latch head carried thereby.

As disclosed in the accompanying drawings, 1 denotes a body member or reservoir of desired dimensions and which has its lower end closed by a bottom plate 2. Secured to and depending from the body portion of the member 1 is a stationary shovel 3 with which coacts a swinging shovel 4. The shovel 4 is pivotally connected, as at 5, with the lower portion of the member 1. The shovel 4 is constantly urged toward the shovel 3 by an expansible member 5', herein disclosed as a coil spring, encircling a rod 6. This rod 6 at one end is provided with an eye 7 positioned between two outstanding lugs 8 carried by the pivoted end portion of the shovel 4 and through which is directed a pintle member 9. The outer end portion of this rod 6 is freely disposed between an outstanding guide lug 10 secured, as illustrated in the accompanying drawing, to the lower portion of a plant chute 11. The expansible member or spring 5' is interposed between the eye 7 of the rod 6 and the guide lug 10.

The plant chute 11 is cylindrical in form and preferably decreases in diameter from its outer or upper end to its inner or lower end. This chute extends downwardly and inwardly of the body member 1 to the bottom plate 2 and discharges through said plate 2 as is believed to be clearly illustrated in the accompanying drawing. As is illustrated in the drawing, the upper or outer end of the chute 11 is exterior of the body member 1 and has its end substantially coplanar to the hand grasp 12 carried by the upper end portion of the body member 1. This is to facilitate the insertion of the tobacco plant and by having the chute 11 cylindrical passage of said plant down through the chute 11 is materially facilitated.

The opposite end portions of the pintle member 9 are continued by the rods 14 which extend upwardly at opposite sides of the chute 11 and are pivotally connected, as at 15, to the side members 16 of a lever L. This lever L, as herein disclosed, has an oblong portion surrounding the upper part of the chute 11 with its outer cross member 17 pivotally connected, as at 18', with the outer portion of the upper part of the chute 11. This lever L has the inner cross member 18 provided with an extension 19 which underlies the hand grasp 12 and is adapted to be readily engaged by certain of the digits of the hand of the operator grasping the hand grip 12. As the lever L is swung in a direction toward the grasp 12 the shovel 4 will be swung outwardly into open position and upon release of the lever the expansible member or spring 5' will automatically return the shovel 4 to closed position.

The bottom plate 2 is provided with a discharge opening 20 and which discharges directly upon the stationary shovel 3. This opening 20 is normally closed by a valve 21 arranged at the lower end portion of an elongated valve stem 22. This stem 22 possesses a certain degree of inherent resiliency and has its upper end portion threaded through a laterally disposed foot 23 carried by the lower end portion of a latch head 24. Threaded on this stem 22 for coaction from below with the foot 23 is a lock nut 25. When the valve 21 is in its normally closed position, the latch head 24 is engaged over the inner cross member 18' of the lever L so that as the lever L is swung toward the grip 12 to swing the shovel 4 outwardly, the valve 21 will be moved into open position to permit requisite discharge of water. This opening of the valve 21 occurs at the initial movement of the lever L and preferably before the shovel 4 has swung outwardly a distance sufficient to permit the setting of the plant which has been inserted in the chute 11. As the lever L is further moved to effect the desired full opening of the shovel 4 the latch head 24 contacts with a member 26 depending from the hand grasp 12 and inclined toward the chute 11. This will result in the latch head 24 being freed from the cross member 18 whereupon the valve 21 will be immediately returned to its normal or closed position through the action of the retractile member 27. The member 27 comprises a coil spring having one end suitably secured to the latch head 24 and its opposite end portion to an inwardly disposed lug 28 herein disclosed as suitably secured to the chute 11.

The valve 21 is preferably of rubber although it can be of any other material desired and this valve is surrounded by an upstanding cylindrical guard 29 which assures the maintenance of its proper position with respect to the discharge opening 20. The wall of this guard 29 immediately adjacent to the bottom plate 2 is provided with notches 30 to facilitate the flow of the water down through the opening 20 when the valve 21 is in open position.

It is of particular advantage in planting to protect a plant held between the shovels 3 and 4 before being set against contact by the water as first discharged into the ground. For this reason I therefore intersect the major portion of the shovel 3 with a plate 31 which extends from the bottom plate 2 of the member or reservoir 1 to a point closely adjacent the outer end of the shovel 3 but leaving an opening 32 of an area to assure unhampered discharge of the water. This plate or protecting sheet 31 may be held in applied position in any desired manner but I prefer to weld the upper side marginal portions thereof to the lower portions of the member 1 immediately below the bottom plate 2.

It is believed to be apparent from the foregoing that in a planting operation the shovels 3 and 4 while closed are first forced into the ground and a plant directed down through the chute 11. The planter is then slightly raised whereupon pull is imposed on the lever L to first permit discharge of the desired amount of water and then separating the shovels 3 and 4 to allow for the setting of the plant. These operations occur while the planter as a whole is continuing to be raised and as the shovels 3 and 4 pass out of the ground the dry soil will fill in around the set plant to cover up all the water, thus assuring the desired placement of the plant.

From the foregoing description it is thought to be obvious that a tobacco planter constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A planter of the class described comprising, in combination, a reservoir, two shovels carried by the reservoir and movable one with respect to the other, means for moving said shovel, said reservoir having an opening discharging between the shovels, a plant chute carried by the reservoir and delivering between the shovels, a valve for normally closing the discharge opening, a protecting plate associated with the second shovel to protect a plant inserted through the chute from the water as discharged from the reservoir, and means for moving the valve into open position, said plate being secured to the lower portion of the reservoir and extending downwardly within the second shovel, the lower end of the plate being spaced from said shovel to provide an opening for the passage of the water.

2. A planter of the class described comprising a reservoir, a shovel fixedly carried by the lower portion of the reservoir, a second shovel pivotally secured to the lower portion of the reservoir and having swinging movement toward and from the first shovel, a plant chute carried by the reservoir and discharging between the shovels, the lower end portion of the reservoir being provided with a discharge opening delivering between the shovels, an outstanding lug carried by the pivoted shovel, a rigid member having an eye, a pintle disposed through said lug and eye for connecting the rigid member and lug, a guide lug positioned above the pivoted shovel and through which the rigid member is directed, a spring interposed between the lugs and surrounding the rigid member for normally maintaining in closed position the shovel carrying the lug, the extremities of the pintle being continued to form elongated rods extending to the upper portion of the reservoir, a swinging lever carried by the upper portion of the reservoir and to which the rods are connected, the movement of the lever in one direction imparting separating movement to the pivoted shovel against the action of the spring.

WARD B. OWEN.